(12) United States Patent
Kitakoshi et al.

(10) Patent No.: US 6,510,134 B1
(45) Date of Patent: Jan. 21, 2003

(54) NON-BREAK CHANGE-OVER DEVICE FOR REDUNDANCY SYSTEM IN INFORMATION TRANSMISSION SYSTEMS

(75) Inventors: Manabu Kitakoshi, Tokyo (JP); Takashi Ezawa, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/267,780

(22) Filed: Mar. 15, 1999

(30) Foreign Application Priority Data

Apr. 15, 1998 (JP) .......................................... 10-121754

(51) Int. Cl.[7] .............................................. G01R 31/08
(52) U.S. Cl. ..................................................... 370/216
(58) Field of Search ................................ 370/351, 352, 370/347, 441, 442, 229, 350, 503, 216, 217, 218, 219, 220, 221, 227, 228, 509, 252, 254, 241; 379/221; 340/825.03, 825.01, 827

(56) References Cited

U.S. PATENT DOCUMENTS 6,108,727 A * 8/2000 Boals et al. .................. 710/68
6,246,875 B1 * 6/2001 Seazholtz et al. ........... 455/432

* cited by examiner

Primary Examiner—Dang Ton
(74) Attorney, Agent, or Firm—Rabin & Berdo, P.C.

(57) ABSTRACT

A non-break change-over device (20) used for a redundancy system having a standby system and an active system. The non-break change-over device (20) is provided with a monitoring section (21), internal switching circuits (23) and (23'), external switching circuits (24) and (24') and delay circuits (25) and (25'). Outputting of a switching request signal (28) fed by an external switching circuit (24) is made delayed by the delaying action of a delay circuit (25) until a frame pulse (26) is inputted. This enables switching between an active state and a standby state during the same frame even if a frame pulse for a standby system is out of phase with that for an active system.

11 Claims, 8 Drawing Sheets

RELATED ART

FIG. 3
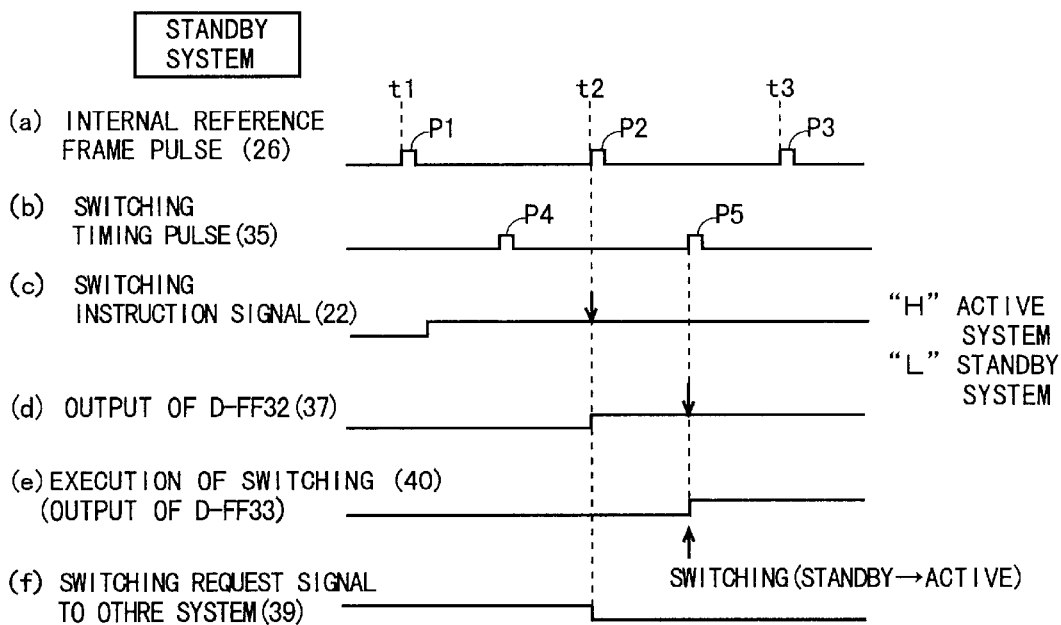
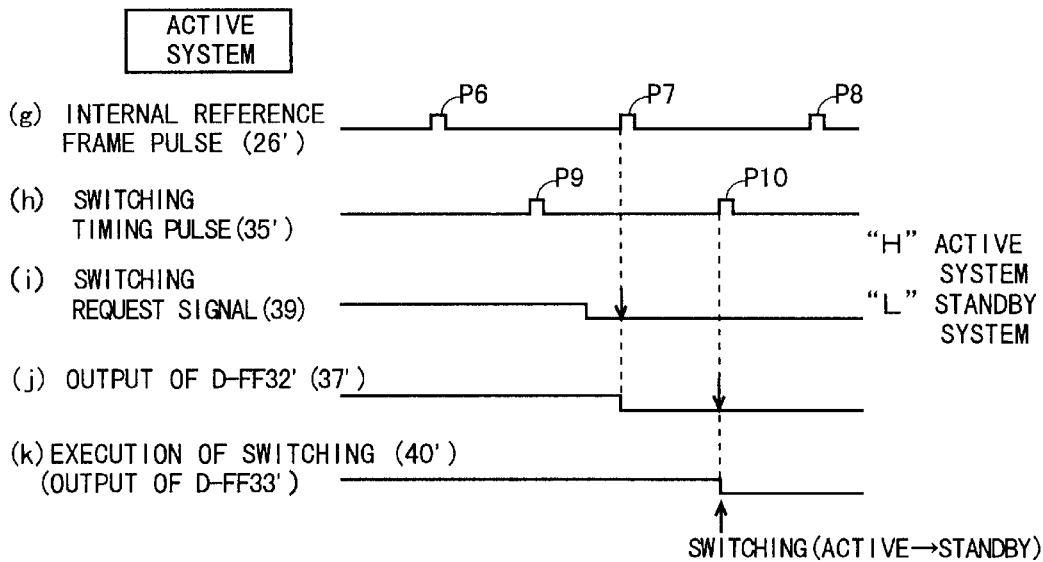

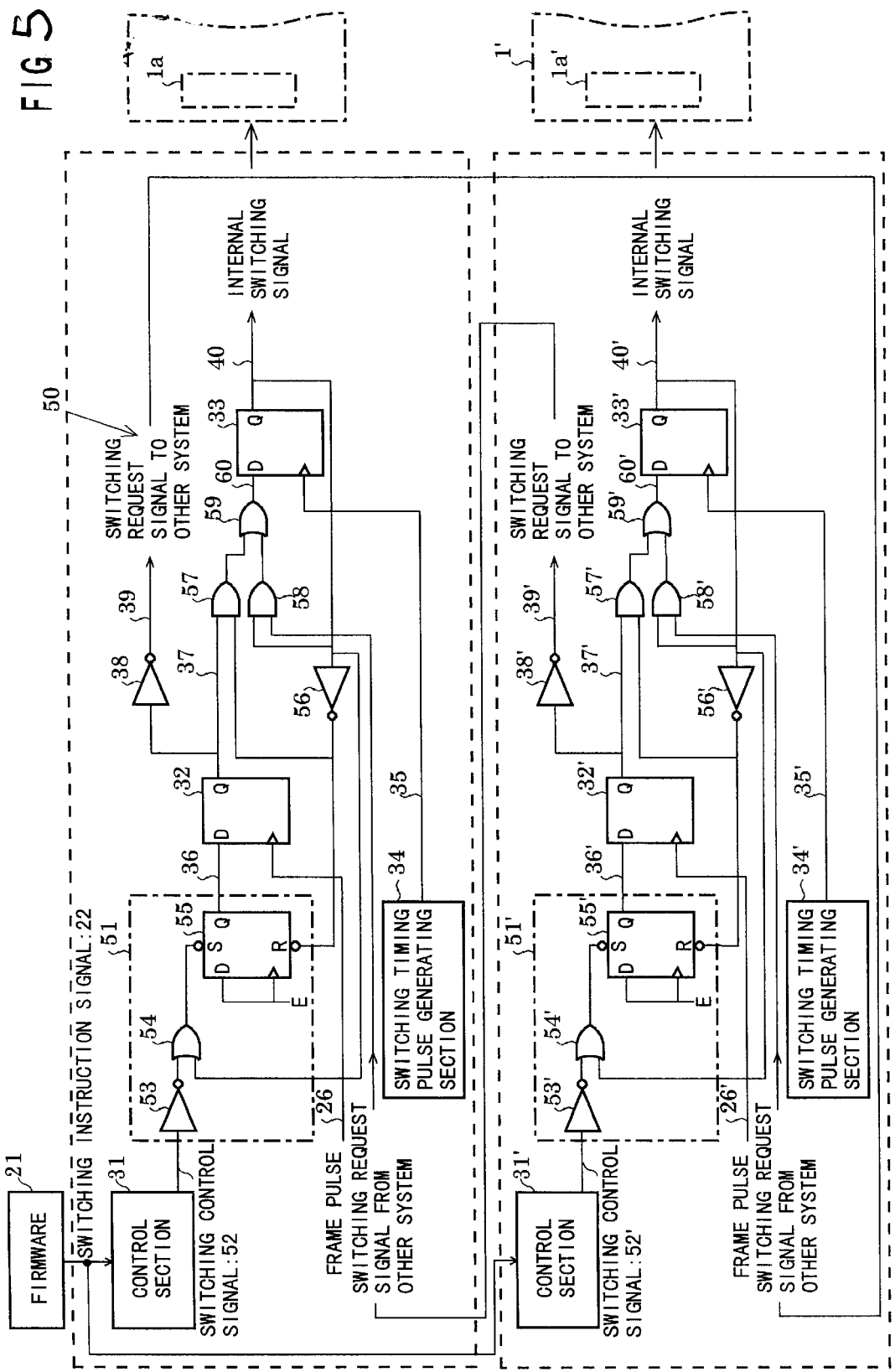

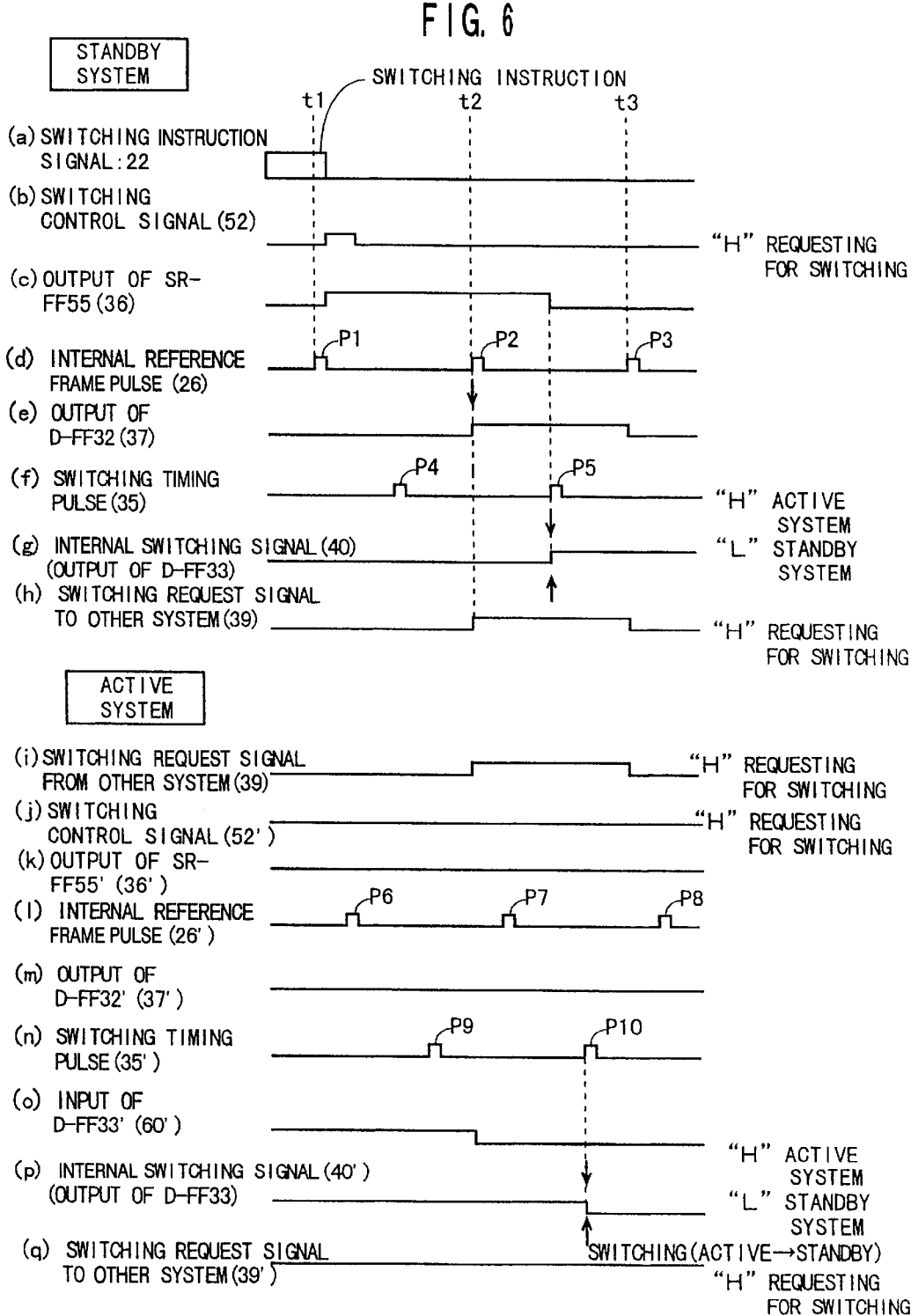

FIG. 9
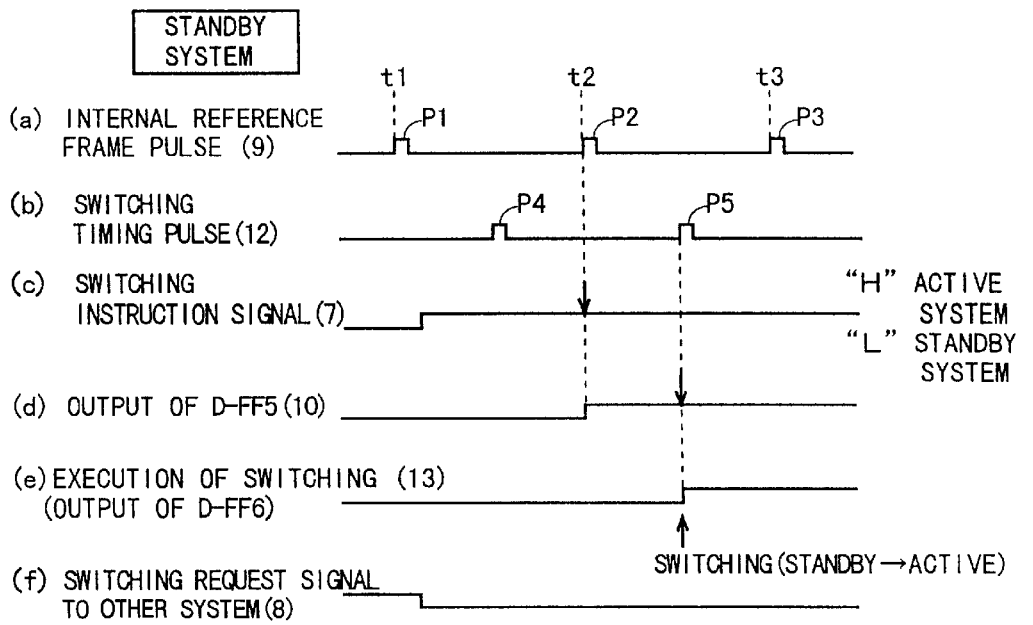
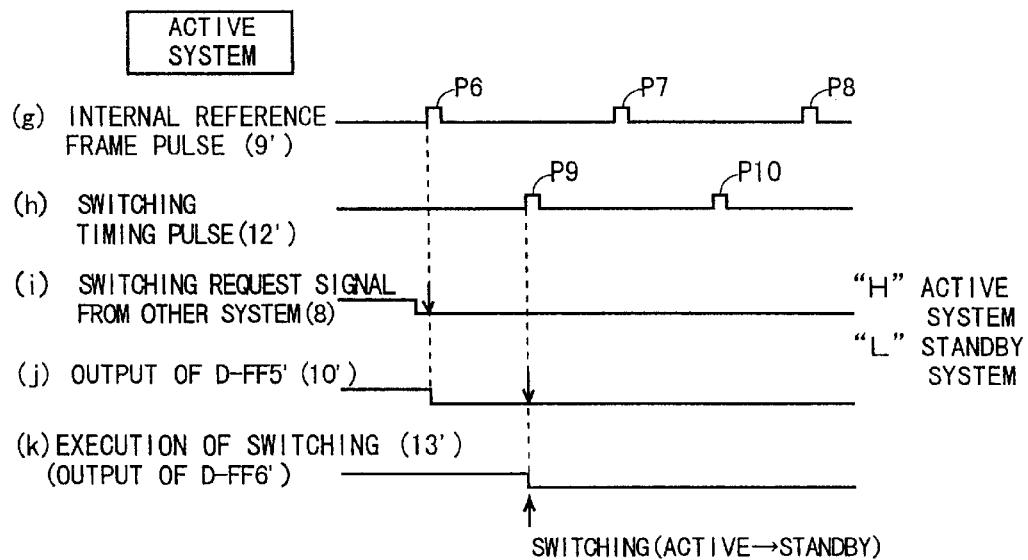
RELATED ART

NON-BREAK CHANGE-OVER DEVICE FOR REDUNDANCY SYSTEM IN INFORMATION TRANSMISSION SYSTEMS

BACKGROUND OF THE INVENTION

1. Field of the Invention

The present invention relates to a non-break change-over device used for a redundancy system adapted to be multiplexed by using an active system and a standby system, which enables each of these two systems to be switched alternately, thus achieving an improvement of reliability.

2. Description of the Related Art

A redundancy system has been conventionally adopted in such transmission equipment and the like as require high reliability, which is designed to multiplex each of functional blocks, circuit boards or transmission paths constituting the transmission equipment by utilizing an active system and a standby system. In such a system, for example, a monitoring section loaded with firmware has been used to monitor each of multiplexed components of the device.

When a necessity occurs for, for instance, maintenance and checking in one information transmission system functioning as an active system, a switching signal providing instructions for switching from the standby state to an active state is fed from the monitoring section to the other information transmission system functioning as a standby system. When the standby system receives, from the firmware, an instruction for switching, an external switching signal is sent to the active system and thus switching between standby and active systems can be achieved through this mutual signal communications with a matched timing.

If a standby system receives, from the firmware, an instruction for switching, it sends out a switching request signal to an active system and, at the same time, it internally generates a switching signal and performs switching control therein. Because both frame pulses each controlling the active and standby system respectively have the same period, if these frame pulses are in phase with each other, switching between the active and standby systems can be achieved at a stroke within the same frame. However, due to a time-delay caused by a difference in the transmission paths extending from the same generating source, and to other conditions, these frame pulses for each system are not always in phase with each other. Accordingly, in the case where the frame of the active system leads slightly that of the standby system, if input timing of a switching instruction from the firmware is not matched, a switching of the standby system to an active state within the frame during which switching of the active system to a standby state has been performed cannot be achieved, causing any system not to function as an active one, i.e., possibly no operations of any system in some cases.

FIG. 8 shows a conventional redundancy system having first and second information transmission systems and a conventional non-break change-over device provided in relation thereto. The first and second information transmission systems, 1 and 1' are, for example, information processing devices which deal with information in units of frames defined by frame pulses having the same period and both of them have the equivalent functions. The conventional non-break change-over device 2 is provided which constitutes the redundancy system together with both information transmission systems 1 and 1'.

The non-break change-over device 2 is provided with a monitoring section comprising firmware into which a monitoring program is stored. Also, the non-break change-over device 2 is provided with control sections 4 and 4', first D flip-flops 5 and 5' and second D flip-flops 6 and 6' corresponding to the information transmission systems 1 and 1' respectively.

Both of these information transmission systems 1 and 1' are equipped with control circuits 1a and 1a' which are in advance set so that one information transmission system functions as a standby system and the other as an active system.

The monitoring section 3 is used to monitor the operational states of both the information transmission systems 1 and 1' and to send out a switching instruction signal 7 to either of control sections 4 or 4' corresponding to either of the information transmission systems 1 or 1' which is then functioning as a standby system when switching between the active and standby systems is required, including a case where malfunctions have occurred which are so slight as not to cause a stop page of transmission operations of currently operating information transmission systems 1 or 1', or a case where a necessity for maintenance and checking occurs in currently operating information transmission systems 1 or 1'.

For example, while one information transmission system 1 is functioning as a standby system, if the control section 4 corresponding to this information transmission system 1 receives a switching instruction signal 7, it feeds a switching request signal 8 to the control section 4' corresponding to the other information transmission system 1' and at the same time transfers a switching instruction signal 7 to the first flip-flop 5 corresponding to said information transmission 1.

The first flip-flop 5 to which the switching instruction signal 7 is transferred from the control section 4, when it receives a frame pulse 9 from the corresponding information transmission system 1, feeds an output signal 10, based on the transferred switching instruction signal 7, to the second flip-flop 6. When the second flip-flop 6 receives a switching timing pulse 12 from a switching timing pulse generating section 11, it outputs an internal switching signal 13, based on the output signal 10 sent from the first flip-flop 5.

The internal switching signal 13 from the second flip-flop 6 is outputted as a switching signal for switching to an active state to the control circuit 1a of the information transmission system 1 functioning as a standby system, by which switching of the information system 1 from its standby state to an active state is achieved accordingly.

On the other hand, the currently operating control section 4', when it receives a switching request signal 8 from the control section 4 of said one information transmission system 1, outputs a switching request signal 8' and a switching instruction signal 7'. The standby control section 4 receiving the switching request signal 8' from the control section 4', because it has received said switching instruction signal 7 from the monitoring section, does not respond to the switching request signal 8' and ignores it. Also, when the first flip-flop 5' receiving the switching instruction signal 7' from the control section 4' is given a frame pulse 9' from the corresponding information transmission system 1', it outputs an output signal 10' to the second flip-flop 6' based on the switching instruction signal 7' as in the case of the first flip-flop 5 of the standby system.

The second flip-flop 6', when it receives a switching timing pulse 12' from a switching timing pulse generating section 11', outputs an internal switching signal 13' based on the output signal 10' from the first flip-flop 5'.

The internal switching signal 13' from the second flip-flop 6' is fed as a switching signal for switching to a standby state to said control circuit 1a' of the information transmission system 1' functioning as an active system, by which switching of the information transmission system 1' from its active state to a standby state is achieved accordingly.

Each of the switching timing pulse generating section 11 and 11' provided corresponding to each of the information transmission system 1 and 1' produces switching timing pulses 12 and 12' respectively, based on the frame pulses from each of the information transmission systems 1 and 1'. Each of the timing pulses 12 and 12' has the same period as the frame pulses 9 and 9' respectively and also is by about half the period out of phase with the frame pulses. As described above, there is a case where the frame pulse, which is generated based on a clock signal from one clock generating source, from the currently operating information transmission system 1 or 1' slightly leads that of the standby information transmission system 1 or 1' due to a time-delay caused by difference in transmission paths to each of the information transmission systems 1 and 1'.

FIG. 9 is an operational timing chart of the conventional non-break change-over device 2 observed when the frame pulse from an active system slightly leads that from a standby system.

In FIG. 9, the timing of signals is illustrated including the internal switching signal 13, switching request signal 8 and the like based on the frame pulses 9 and 9' and switching timing pulses 12 and 12' from both active and standby systems.

The internal reference frame pulses 9 shown in FIG. 9 (a) are frame pulses used to control the timing in the standby information transmission system comprising a group of pulses having their pulse peaks (P1, P2 and P3) at time t1, t2 and t3 respectively. The switching timing pulses 12 shown in FIG. 9 (b) are a group of pulses (P4 and P5) each having the same period as the frame pulse 9 and each being by half the period out of phase with the frame pulse 9. The frame pulse 9 for the active system has the same period as the frame pulse 9' for the standby system and the frame pulse 9' from the active system slightly leads that of the frame pulse 9 from the standby system. Also, the switching timing pulse 12' from the active system has the same relation with respect to its frame pulse 9' as in the case for the standby system.

As shown in FIG. 9 (c), the Low (L) level of the switching instruction signal 7 from the monitoring section 3 represents a switching instruction to be given to the standby system and the High (H) level to the active system. That is, after the switching instruction signal 7 as shown in FIG. 9 (c) is inputted from the monitoring section 3 immediately after the time t1 to a control section, i.e., an external switching circuit 4 of the standby system shown in FIG. 8, this switching signal 7 is then outputted, by the pulse 2 at the subsequent time t2, as an output signal 10 from the first flip-flop 5 to the second flip-flop, i.e., an internal switching circuit 6. As shown in FIG. 9 (d), the output signal 10 being fed to the internal switching circuit 6, after the internal switching circuit has received a pulse P5, i.e., the switching timing pulse 12 given after the time t2, is outputted as an internal switching signal 13, as shown in FIG. 9 (e) from the internal switching circuit 6 to the control circuit 1a of the information transmission system 1 in the subsequent frame following the frame between the time t1 and t2. By this switching function of the control circuit 1a receiving the internal switching signal 13, switching of the information transmission system 1 from its standby state to an active state is achieved accordingly.

Also, when the switching instruction signal 7 is fed immediately after the time t1 to the external switching circuit 4, as shown in FIG. 9 (f), the signal 7 with the level of the signal inverted is outputted as a switching request signal 8 to the currently operating control section, i.e., the external switching circuit 4' of the active system.

When the control section 4' of the active system receives a switching request signal 8 from the control section 4 of the standby system as shown in FIG. 9 (i), the signal 8 is transferred as a switching instruction signal 7' to the first flip-flop 5'. If the first flip-flop 5' receives the frame pulse 9' the phase of which slightly leads that of the frame pulse 9, as shown in FIG. 9 (j), it switches its output from an H level to an L level at the time when the pulse P6 is given. The second flip-flop 6' receiving the above output 10', when it receives a pulse P9, i.e., the switching timing pulse 12', causes the output signal 10' to be fed as an internal switching signal 13' from the internal switching circuit 6' to the control circuit 1a' of the information transmission system 1'. By the switching function of the control circuit 1a' receiving this internal switching signal 13', switching of the information transmission system 1' from its active state to a standby state is achieved accordingly.

FIG. 10 is an explanatory drawing of above-described switching states in relation to pulse frames from the active and standby systems. The states are described hereinafter by referring to FIG. 10 wherein the control section 4 corresponding to the standby system receives the switching instruction signal 7 at the time between the head positions of corresponding frame F1 and F1' when the frames F1, F2 and so on from the active system slightly lead the frames F1', F2' and so on from the standby system. Under this condition, in the standby system, when the first flip-flop 5 receives a frame pulse 9 (P2), an output signal 10 is fed at the time t2 from said first flip-flop 5 to the second flip-flop 6 and when this second flip-flop receives a switching timing pulse 12 (P5), an internal switching signal 13 is outputted from the second flip-flop 6. Therefore, in the standby system, switching from its standby state to an active state occurs during frame F2 following frame F1 where the switching instruction signal 7 is received.

On the other hand, in the active system receiving a switching request signal 8 from the standby system, when the first flip-flop 5' receives the frame pulse 9' (P6), an output signal 10' is fed from the first flip-flop 5' to the second flip-flop 6' and when the second flip-flop 6' receives a switching timing pulse 12 (P7), an internal switching signal 13' is outputted from the second flip-flop 6'. Therefore, in the active system, switching to a standby state occurs during the frame F1' corresponding to the frame F1.

For this reason, although the switching from the active system to the standby system is carried out during the frame F1', the switching from the standby system to the active system is carried out not during the frame F1 corresponding the frame F1' but during the subsequent frame 2, causing lack of information during substantial one frame. Thus, in the conventional non-break change-over device, there has been a problem of the lack of information corresponding to one frame in the switching operation.

The object of the present invention is, therefore, to provide a non-break changeover device which does not cause lack of information in the switching operations between an active system and a standby system regardless of the state of input timing of a switching instruction signal to be fed from a monitoring section even under the condition where a frame from the active system slightly leads that from the standby system.

Another object of the present invention is to provide a non-break change-over system which does not cause the lack of information in the switching between an active system and a standby system.

According to the present invention, a non-break change-over device is provided for complementarily switching first and second information transmission systems between an active state and a standby state and for constituting a redundancy system together with the both information transmission systems each having the same functions and each handling information in units of frames defined by frame pulses having the same period each other, comprising a monitoring section used to monitor each of the information transmission systems and to generate a switching instruction signal used to switch one information transmission system functioning as a standby system to an active system when a necessity occurs for switching the said information transmission system between the active state and standby state, an internal switching circuit provided corresponding to each of the information transmission systems which is used, when the internal circuit corresponding to one information transmission system described above receives a said switching signal from the monitoring section, to generate an internal switching signal which is outputted in synchronization with timing pulses each having the same period as the frame pulse from the other information transmission system but being out of phase with said frame pulse in order to cause the other information system to b transmission system e switched to an active state, an external switching circuit provided corresponding to each of the information transmission systems which is used, when the external switching circuit corresponding to said one information transmission system described above receives the switching signal from the monitoring section, to output a switching request signal to the internal switching circuit of the said other information transmission system in order to cause the other information transmission system that was functioning as an active system to operate as a standby system, and a delay circuit provided corresponding to each of the information transmission systems which is used to give a time-delay to a switching request signal to be fed from the external switching circuit of one information transmission system to the internal switching circuit of the other information transmission system in order to perform switching operations between the standby state and active states in said information transmission systems within the same frame of pulses from both information transmission systems.

Each timing pulse for each of the information transmission systems is by about half the period out of phase with the frame pulse from each of the corresponding information transmission systems.

Said internal switching circuit corresponding to one information transmission system that was functioning as a standby system receives the switching instruction signal from the monitoring section through the external switching circuit of the other information system and also this internal switching circuit corresponding to one information transmission system outputs the internal switching signal during the subsequent frame following the frame during which the external switching circuit of the other information transmission system has received the switching instruction signal and also, at the time of the head of the frame following the frame described above, the external switching circuit corresponding to one information transmission system outputs the switching request signal toward the internal switching circuit of the other information system that was functioning as an active system.

The delay circuit operates in synchronization with the frame pulse from either of the information transmission systems corresponding to the delay circuit, comprising a first holding circuit to hold the switching request signal to be sent to the other information transmission system when the frame pulse is received, and also each of the internal switching circuits operates in synchronization with the timing pulse from either of the corresponding information transmission systems, comprising a second holding circuit to hold the switching request signal fed by the first holding circuit when the timing pulse is received.

The first and second holding circuits can be constructed by using flip-flops.

The flip-flops can be constructed by using D flip-flops.

Another aspect of the present invention is that provides a non-break change-over device for complementarily switching first and second information transmission systems between an active state and a standby state and for constituting a redundancy system together with the both information transmission systems each having the same functions and each handling information in units of frames defined by frame pulses having the same period each other, comprising a monitoring section used to monitor each of the information transmission systems and to generate a switching instruction signal used to switch one information transmission system functioning as a standby system to an active system when a necessity occurs for switching the information transmission system between the active state and standby state, a first flip-flop provided corresponding to each of the information transmission systems, wherein said first flip-flop corresponding to one information transmission system, when it receives the switching instruction signal from the monitoring section, is used to output a switching request signal, in synchronization with the frame pulse of one information transmission system, to cause the other information transmission system to function as a standby system or one information transmission system to function as an active system, or said first flip-flop provided corresponding to the other information transmission system, when it receives the switching request signal from the first flip-flop provided corresponding to one information transmission system, is used to output a switching request signal, in synchronization with the frame pulse of the other information transmission system, to cause the other information system to function as a standby system, and a second flip-flop provided corresponding to each of the information transmission systems, wherein the second flip-flop, when it receives the switching request signal fed by the first flip-flop corresponding to the information transmission system for which this second flip-flop is provided, is used to output an internal switching signal to the information transmission system in synchronization with a timing pulse having the same period as the frame pulse from the information transmission system for which the second flip-flop and being out of phase with the above frame pulse, characterized in that switching operations of one information transmission system to an active state performed by the switching request signal from the second flip-flop corresponding to one information transmission system and of the other information transmission system to a standby state by the switching request signal from the second flip-flop corresponding to the other information transmission system occur during the same frame corresponding to both information transmission systems.

During the subsequent frame following the frame during which the first flip-flop corresponding to one information transmission system that was functioning as the standby system has received the signal corresponding to the switching instruction signal from the monitoring section, the second flip-flop corresponding to one information transmission system outputs the internal switching signal, and also the second flip-flop corresponding to one information transmission system that was functioning as the standby system outputs, at the time of the head of the frame following the frame described above, the switching request signal to the first flip-flop corresponding to the other information transmission system that was functioning as the active system.

Between the monitoring section and each of the first flip-flops, a control section may be provided which is used to output the switching instruction signal or the signal corresponding to the switching request signal to the corresponding first flip-flop when the switching instruction signal is received from the monitoring section or the switching request signal from the first flip-flop of one information transmission system receiving the switching instruction signal.

The control section provided corresponding to one information transmission system, when it receives the switching instruction signal from the monitoring section and even if it receives the switching request signal from the first flip-flop provided corresponding to the other information transmission system, neither respond to this switching request signal nor output said signal to the first flip-flop provided corresponding to said one information transmission system.

Between the monitoring section and each of the first flip-flops, a control section is provided which is used to output the signal corresponding to the switching instruction signal to the corresponding first flip-flop when the control section receives the switching instruction signal from the monitoring section and the switching request signal fed by the first flip-flop provided corresponding to one information transmission system is inputted to the second flip-flop provided corresponding to the other information transmission system, and the second flip-flop, when it receives the switching request signal from the first flip-flop, outputs the internal switching signal in order to cause the other information transmission system to function as the standby system in synchronization with the timing pulse for the other information transmission system.

The features of the present invention will be made further clear by describing hereinafter embodiments with reference to the accompanying drawing.

BRIEF DESCRIPTION OF THE DRAWINGS

FIG. 3 is timing charts showing one example of the operation of the non-break change-over device shown in FIG. 2.

FIG. 5 is a block diagram of another embodiment of a non-break change-over device of the present invention.

FIG. 6 is timing charts showing one example of operations of the non-break change-over device shown in FIG. 5.

FIG. 9 is timing charts for the conventional non-break change-over device.

DESCRIPTION OF THE PREFERRED EMBODIMENTS

The embodiments of the present invention will be described hereinafter.

Figure 1:
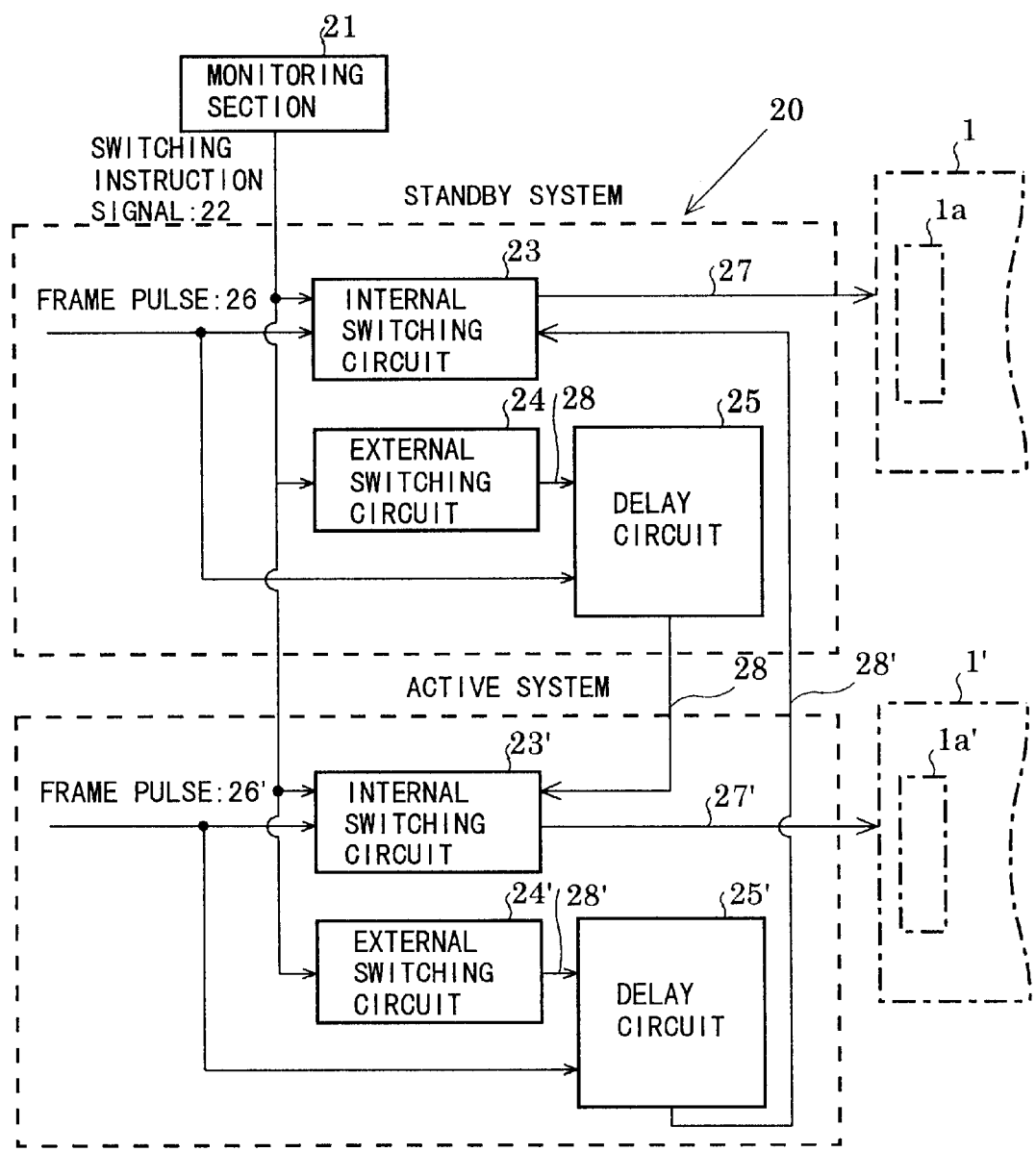
FIG. 1 is a block diagram conceptually illustrating a non-break change-over device of the present invention.

FIG. 1 is a block diagram illustrating conceptually an embodiment of a non-break change-over device of the present invention.

According to the present invention, the non-break change-over device 20 is provided, as in the case of conventional devices, with a monitoring section 21 in order to switch multiplexed information transmission systems from an active state to a standby state and vice versa comprising a first and second information transmission systems 1 and 1'. The monitoring section 21 has a function to detect any fault, for example, in the currently operating systems 1 or 1' thereby outputting a switching instruction signal 22. This monitoring section 21 can be constructed by using the conventional firmware for control.

Also, the non-break change-over device 20 is provided with internal switching circuits 23 and 23', external switching circuits 24 and 24' and delay circuits 25 and 25' each corresponding to the information transmission systems 1 or 1'.

The information transmission systems 1 and 1' are provided with control circuits 1a and 1a' therein, each of which is adapted to receive signals from internal switching circuits 23 and 23' respectively so that one information transmission systems functions as a standby system and the other as an active system and vice versa.

Each of the internal switching circuits 23 and 23', when it receives a switching instruction signal 22 from the monitoring section 21, outputs internal switching signals 27 and 27' respectively to each of control circuits 1a and 1a' of the corresponding information transmission systems 1 and 1' in synchronization with each of frame pulses 26 and 26' for operation control from the corresponding information transmission systems 1 and 1' respectively.

Moreover, as described later, each of the internal switching circuits 23 and 23', when it receives switching request signals 28' and 28 respectively from the corresponding external switching circuits 24' and 24 provided corresponding to the other information transmission systems 1' and 1 through each of delay circuits 25' and 25, outputs the same internal switching signals 27 and 27' respectively as described above to each of control circuits 1a and 1a' of the corresponding information transmission systems 1 and 1'.

Each of the control circuits 1a and 1a' of the information transmission systems 1 and 1', when it receives internal switching signals 27 and 27' respectively from corresponding internal switching circuits 23 and 23', switches each of the information transmission systems 1 and 1' from the active to standby states and vice versa. Also, each of the external switching circuits 24 and 24', when it receives a switching instruction signal 22 from the monitoring section 21, outputs switching request signals 28 and 28' respectively to switch each of the internal switching circuits 23' and 23 of each of the information transmission systems 1' and 1 being opposite to the corresponding information transmission systems 1 and 1' to the corresponding delay circuits 25 and 25'.

Each of the delay circuits 25 and 25' receives each of frame pulses 26 and 26'. Each of the delay circuits 25 and 25', when it receives switching request signals 28 and 28' respectively, monitors the inputting of each of the frame pulses 26 and 26' and causes the inputting of each of switching signals 28 and 28' into each of the internal switching circuits 23 and 23' to be delayed until each of the delay circuits receives each of the frame pulses 26 and 26' following the frame pulses 26 and 26' with which each of the internal switching circuits 23 and 23' operates in synchronization.

In the embodiments below, the state where the first information transmission system 1 is functioning as a standby system and the second information transmission system 2 as an active system will be described in the same manner as in the related art.

The monitoring section 21 sends out selectively the switching instruction signals 22 produced within the monitoring section as described above to the internal switching circuit 23 and external switching circuit 24 of one system functioning as a standby system out of two information transmission systems 1 and 1'.

The internal switching circuit 23 corresponding to the standby system 1, when it receives the switching instruction signal 22 from the monitoring section 21, as described above, sends out the internal switching signal 27 to the control circuit 1a of the first information transmission system 1 in synchronization with the frame pulse 26 used for operational control, thereby switching the first information transmission system 1 functioning as a standby system to an active system.

On the other hand, the external switching circuit 24 corresponding to the standby system 1, when it receives the switching instruction signal 22 from the monitoring section 1, feeds the switching request signal 28 to the internal switching circuit 23 of the other information transmission system 1', i.e., the system functioning as an active system, as described above, due to a delaying action of the delay circuit 25, with the time-delay which is equivalent to the period of time of the subsequent frame 26 following the frame pulse 26 with which the internal switching circuit 23 operates in synchronization, i.e., to the time of one frame.

Figure 10:
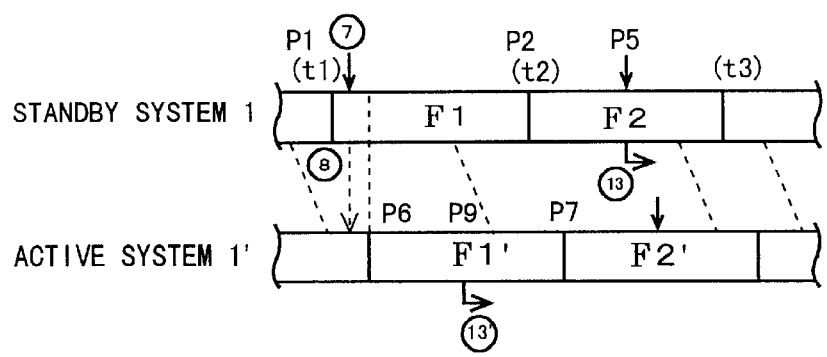
FIG. 10 is an explanatory drawing illustrating the state of switching between an active state and a standby state in relation to frames of pulses in a redundancy system used in the conventional non-break change-over device shown in FIG. 8.
Figure 8:
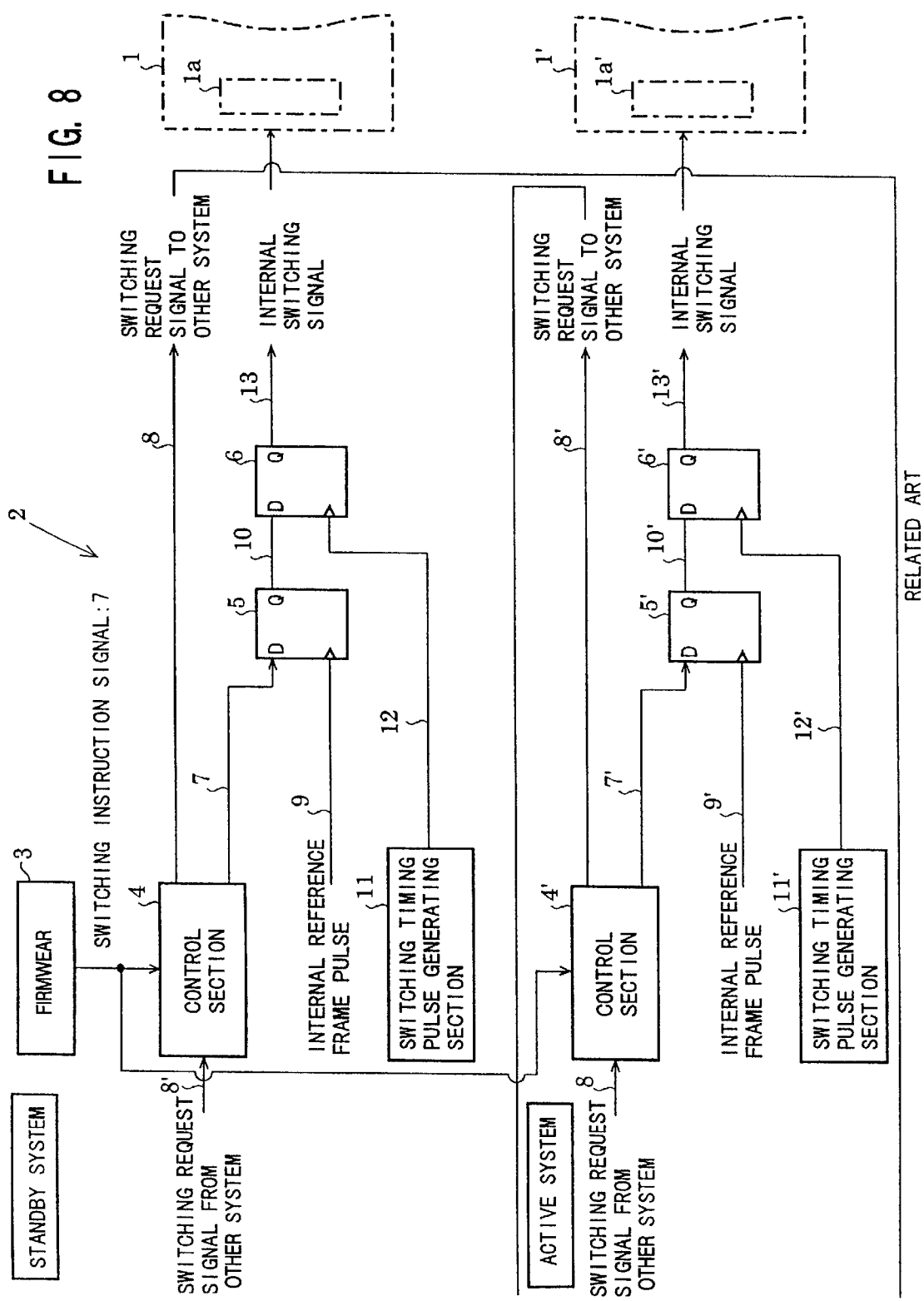
FIG. 8 is a block diagram illustrating a conventional non-break change-over device.

The internal switching circuit 23' of the information transmission system 1' functioning as an active system, when it receives the switching request signal 28, sends out the internal switching signal 27 to the control circuit 1a' of the information transmission system 1' in synchronization with the frame pulse 26' corresponding to the frame pulse 26, thereby switching the second information transmission system 1' functioning as an active system to a standby system. The switching request signals 28 and 28' for switching from an active system to a standby system are sent out to the internal switching circuit 23', as described above, due to the action of the delay circuits 25 and 25', with a delay in time being equivalent to one frame. Accordingly, as shown in FIG. 10, in the state where the frame from the active system leads that from the standby system, even if the switching instruction signal 22 is outputted from the monitoring section 21 at the timing shown by the reference numeral 7 in FIG. 10, the switching of the currently operating information transmission system 1' to its standby state does not occur during the frame F' corresponding to the frame F1 from the standby system, but during the frame F7' corresponding to the subsequent frame F2 during which the switching to the standby system 1 is performed. As a result, even in the state where the frame from the active system leads that from the standby system, switching from the active system to the standby system and vice versa is achieved during the corresponding same frame, thus enabling switching between the active and standby states without such lack of information produced during one frame as seen in the conventional device.

Figure 2:
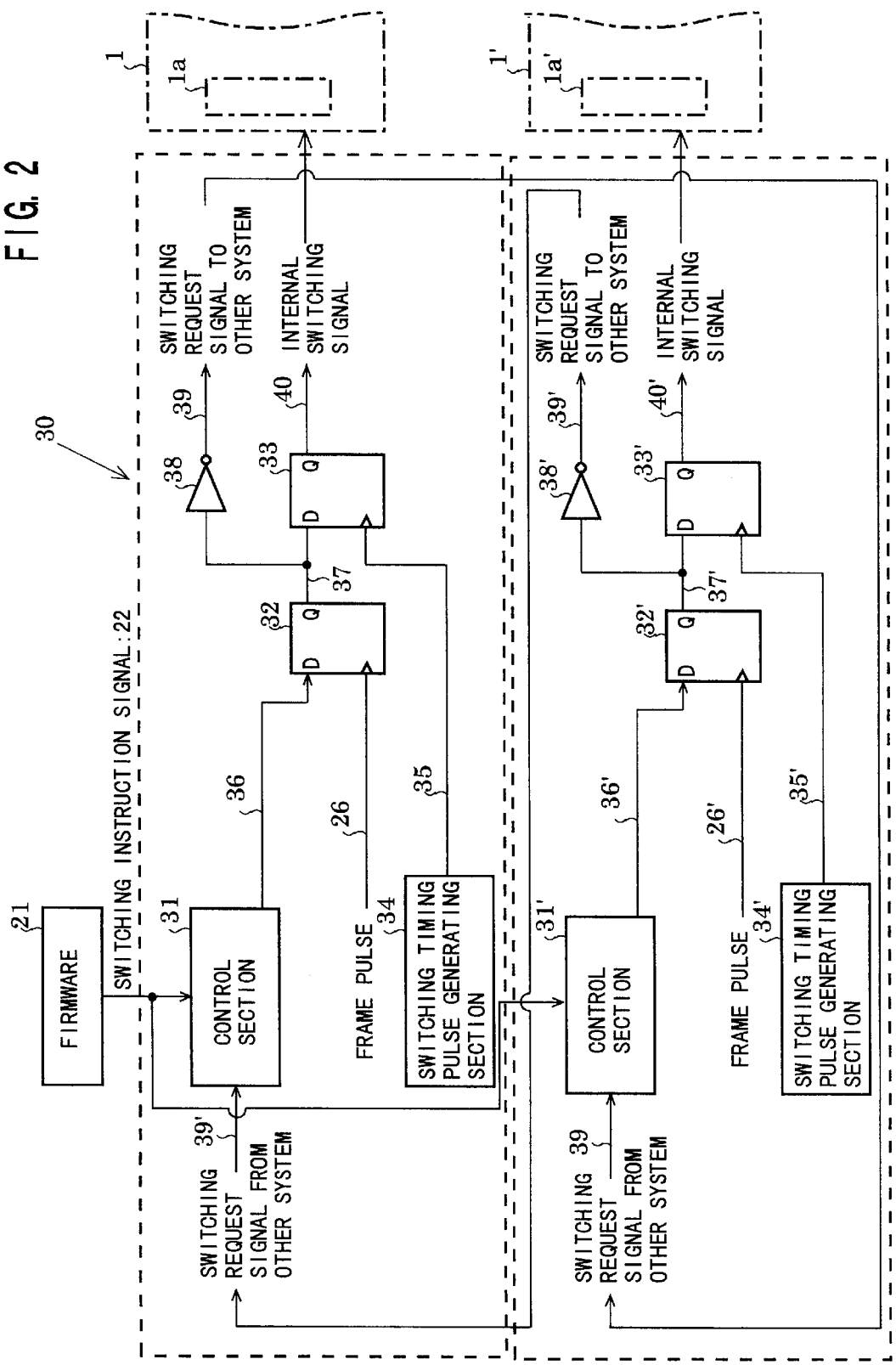
FIG. 2 is a block diagram concretely illustrating the non-break change-over device of the present invention.

FIG. 2 is a circuit connection diagram illustrating more concretely the non-break change-over device of the present invention shown in FIG. 1.

As shown in FIG. 2, the non-break change-over device 30 is provided with control sections 31 and 31' which receive the switching instruction signal 22 from the monitoring section 21. The control section 31 and 31' correspond respectively to the external switching circuits 24 and 24' as shown in FIG. 1. Also, the non-break change-over device 30 is provided with the first flip-flops 32 and 32' respectively corresponding to the first and second information transmission system 1 and 1', and the second flip-flops 33 and 33' respectively corresponding to the first and second information transmission system 1 and 1'.

Each of the first flip-flops 32 and 32' comprises D flip-flops which operate in synchronization with the frame pulses 26 and 26' used for operational control of each of the information transmission systems 1 and 1'. The first flip-flops 32 and 32' correspond to the delay circuits 25 and 25' respectively.

The second flip-flops 33 and 33' comprise D flip-flops which operate in synchronization with switching timing pulses 35 and 35' from switching timing pulse generating sections 34 and 34' which operate, as in the case of the conventional device, based on frame pulses 26 and 26' used for operational control of each of the information transmission systems 1 and 1'.

The switching timing pulses 35 and 35', as in the conventional device, have the same period as the frame pulses 26 and 26' used for operational control of the information transmission systems 1 and 1' and are by half the period out of phase with the frame pulses. The second flip-flops 33 and 33' correspond to the internal switching circuits 23 and 23' as shown in FIG. 1.

The monitoring section 21, when a necessity for switching between an active system and a standby system occurs, sends out selectively a switching instruction signal 22 to, for example, the control section 31 corresponding to the information transmission system 1.

The control sections 31 and 31' receive a switching instruction signal 22 from the monitoring section 21, or the same from the other system described later as in the case of conventional devices. The control sections 31 and 31', when they have received these signals, output a switching instruction signal 22 to the corresponding first flip-flops 32 and 32' or signals 36 and 36' corresponding to the switching request signal. However, the control sections 31 and 31', by receiving the switching instruction signals 22 from the monitoring section 21, does not switch the state of its output signal responding to this switching request signal even if they subsequently receive such a switching request signal from the other system as in the conventional device.

The control section 31 corresponding to, for example, the first information transmission system functioning as a standby system, when it receives a switching instruction signal 22 from the monitoring section 21, outputs a signal 36 responding to the switching instruction signal 22 to the first flip-flop 32. When the first flip-flop 32 receives a signal 36, it outputs a signal 37 in synchronization with a frame pulse 26. Because the state of this output signal 37 is held by the first flip-flop, the flip-flop can substantially serve as a first holding circuit as is apparent from a timing chart shown in FIG. 3.

The output signals 37 and 37' fed by each of the first flip-flops 32 and 32', after the polarity of the pulse is reversed by each of inverters 38 and 38', are converted to switching request signals 39 and 39' to be sent to the other system. Also, output signals 37 and 37' are sent out to the corresponding second flip-flops 33 and 33'. That is, the output signal 37 from the first flip-flop 32 of the first information transmission system 1 functioning as a standby system, by the passage through the inverter 38, as a switching request signal 39, is inputted to the second flip-flop 33' of the second information system 1' functioning as an active system. Also, the output signal 37 is inputted to the second flip-flop 33 of the first information transmission system 1.

When the second flip-flops 33 and 33' receive the output signals 37 and 37', they output internal switching signals 40 and 40' to control circuits 1a and 1a' of the corresponding information transmission systems 1 and 1' in synchronization with switching timing pulses 35 and 35'. The first and second information transmission systems 1 and 1', when their control circuits 1a or 1a' receive the internal switching signal 40 and 40' from the second flip-flops 33 and 33' respectively, are switched from a standby system to an active system and vice versa.

That is, the second flip-flop 33 of the first information transmission system 1 functioning as a standby system, when it receives a signal 37, outputs an internal switching signal 40 in synchronization with a switching timing pulse 35. Because the state of this output signal 40 is held by the first flip-flop, the flip-flop can substantially serve as a second holding circuit as is apparent from a timing chart shown in FIG. 3. Thus, by this internal switching signal 40, the first information transmission system 1 is switched from its standby state to an active state.

On the other hand, the control section 31' of the second information transmission system 1' functioning as an active system, when it receives the switching request signal 39 from the first flip-flop 32 of the first information transmission system 1, outputs a signal 36' to the first flip-flop 32'. The first flip-flop 32', when it receives the signal 36', outputs an output signal 37' to the second flip-flop 33', in synchronization with a frame pulse 26' in the same manner as the flip-flop 32. This flip-flop 33', when it receives the output signal 37', outputs an internal switching signal 40' to the control circuit 1a' of the second information transmission system 1' functioning as an active system in synchronization with the switching timing pulse 35' in the same manner as the flip-flop 33. By this internal switching signal 40', the second information transmission system 1 is switched from the active state to a standby state.

The output signal 37' from the second flip-flop 32', after the polarity of the pulse is reversed by the inverter 38', is converted to the switching request signal 39' and is sent to the control section 31 of the first information transmission system 1. However, as described above, the control section 31 of the first information transmission system 1 that was functioning as the standby system, because it had received the switching instruction signal 22 from the monitoring section 21 before it has received the switching request signal 39', does not output a new signal responding to this switching request signal 39. As a result, this switching request signal 39' does not cause the first information transmission system 1 to be switched again.

Figure 4:
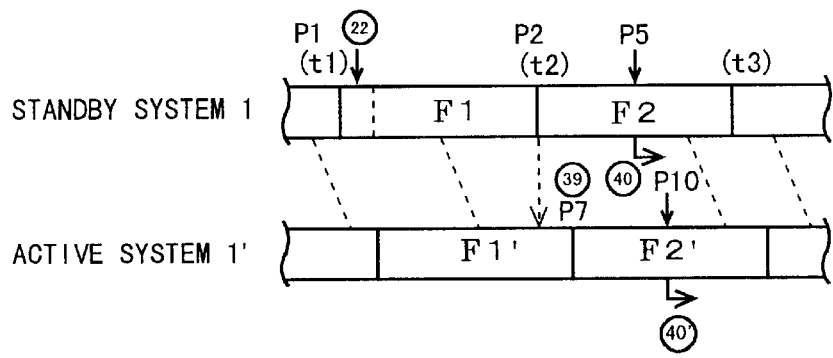
FIG. 4 is an explanatory drawing illustrating the state of switching between an active state and a standby state in relation to frames of pulses in a redundancy system used in the non-break change-over device shown in FIG. 2.

FIGS. 3 and 4 are diagrams being similar to FIG. 9 and FIG. 10 illustrating operations of the non-break change-over system 30 shown in FIG. 2. FIG. 3 shows a state where the frame pulses for the active and standby systems are out of phase with each other in the same manner as in FIG. 9.

That is, FIG. 3 (a) illustrates frame pulses 26 used to control the timing in the standby system, composed of a group of pulses having their respective pulse peaks (P1, P2 and P3) at the time t1, t2 and t3. FIG. 3 (b) illustrates switching timing pulses 35 composed of a group of pulses (P4 and P5) each having the same period as the frame pulse 26 and each being by half the period out of phase with the frame pulse 26 as described above.

Both frame pulses 26 and 26' from the active and standby systems have the same periods, and the frame pulse 26' from the active system slightly leads the frame pulse 26 from the standby system. The switching timing pulse 35' from the active system has the same relation with respect to its frame pulse 26' as in the case for the standby system.

As shown in FIGS. 3 and 4, in the non-break change-over device of the present invention, a switching request signal 39 is not sent out to the control section 31' at the time when the control section 31 receives a switching instruction signal 22 but there is a delay being equivalent to a period of time from the point of receiving the switching instruction till the head point of the subsequent frame of the pulse, by using the first flip-flop 32, in the sending-out of an output signal 37.

The relation of the delay in sending out this output signal is described hereinafter with reference to FIG. 4. FIG. 4 illustrates the state of switching between the active and standby states in terms of frames. As shown in FIG. 4, the frames F1, F2 and so on from the active system lead the frames F1', F2' and so on from the standby system in the similar way to that in FIG. 10. The state is now assumed where the control section 31 corresponding to the standby system receives the switching instruction signal 22 at the time between the heads of the frames F1 and F2 which correspond to each other. Under this condition where the control section 31 has received the switching instruction signal 22, i.e., the first flip-flop 32 has received the signal 36, if the first flip-flop 32 receives the frame pulse 26 (P2), the output signal 37 is outputted to the second flip-flop at the time t2. If the second flip-flop which has already received the output signal 37 receives the switching timing pulse 35 (P5), the second flip-flop 33 outputs the internal switching signal 40 to the control circuit 1a. As a result, in the standby system, switching to the active system occurs during the frame F2 following the frame F1 during which the switching instruction signal 22 has been received.

On the other hand, the control section 31' of the active system 1' does not receive directly from the control section 31 of the standby system 1, but it receives the switching request signal 39 with a time-delay caused by the passage of the signal through the first flip-flop 32, i.e., at the head point of the frame F2 following the frame F1 during which the switching instruction signal 22 has been received.

Because the phase of the frame pulse from the active system 1' leads that of the frame pulse from the standby system 1, the switching request signal 39 which is sent out, due to the time-delay described above, at the head point of the frame F2 from the standby system, is received by the control section 31' during the frame F1' of the active system corresponding to the frame F1 of the standby system 1.

When the control section 31' of the active system 1' receives the switching request signal 39, it sends out the signal 36' to the first flip-flop 32'. The first flip-flop 32' receiving this signal 36' sends out, at the head point (P7) of the frame F2' following the frame F1' and in synchronization with the frame pulse 26', the output signal 37' to the second flip-flop 33'. When the second flip-flop 33' which has already received the output signal 37' receives the switching timing pulse 35' (P10), the internal switching signal 40' is outputted from the second flip-flop 33' to the control circuit 1a'. As a result, in the active system 1', switching to a standby state occurs during the frame F2' corresponding to the frame F2 following the frame F1 during which the switching instruction signal 22 has been received.

In the non-break change-over system 30, as described above, when the frame from the active system leads that from the standby system, the switching between the active and standby states occurs during the same frame corresponding to each other, thus allowing the switching between the two states without such lack of information being equivalent to one frame as seen in the conventional device.

In the non-break change-over system 20 as shown in FIG. 2, in the state where the frame from the active system leads that from the standby system, as described above, preferable switching is made possible. However, if the frame from the active system lags behind that from the standby system, there is a fear that overlapping operations for switching during the same frame of pulses will cause both information transmission systems 1 and 1' to act as an active system.

FIG. 5 shows a non-break change-over device 50 which, even in the state where the frame from the active system leads or lag behind that from the standby system, switching between an active state and a standby state can be achieved without any lack of information during any frame and without overlapping operations in switching during the same frame described above.

Figure 7:
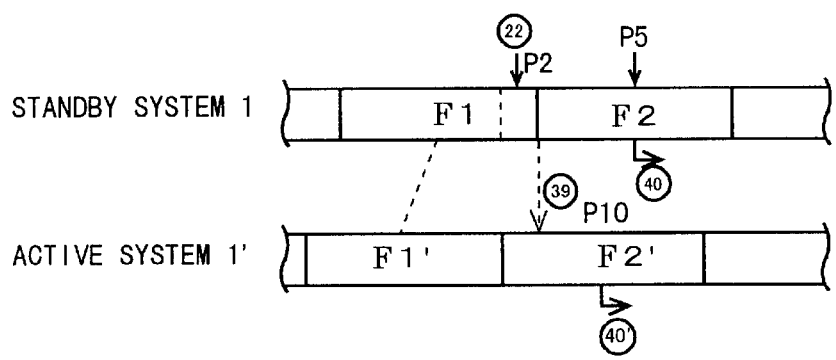
FIG. 7 is an explanatory drawing illustrating the state of switching between an active state and a standby state in relation to frames of pulses in a redundancy system used in the non-break change-over device shown in FIG. 5.

In the embodiment of the non-break change-over device 50 shown in FIG. 5, the same reference numerals are given to parts or components having the same function as those in the non-break change-over device 30 shown in FIG. 2. Also, FIGS. 6 and 7 show timing charts and explanatory drawings of frames respectively corresponding to those shown in FIGS. 3 and 4.

In the non-break change-over device 50 shown in FIG. 5, trigger signals are used for a switching instruction signal 22 fed by a monitoring section 21 and for a switching request signal 39 fed to the standby system as shown in FIGS. 6 (a), (h) and (i). Moreover, in order to obtain signals 36 and 36' fed to first flip-flops 32 and 32', trigger signal processing circuits 51 and 51' are provided between control sections 31 and 31' and first flip-flops 32 and 32'.

The trigger signal processing circuits 51 and 51' are provided with inverters 53 and 53' used to reverse the polarity of switching control signals 52 and 52' from control sections 31 and 31' and with SR flip-flops 55 and 55' which receive the switching control signals 52 and 52' through S terminals flowing via OR logical circuits 54 and 54'.

The SR flip-flops 55 and 55' use negative logic and internal switching signals 40 and 40' from second flip-flops 33 and 33' are inputted to its R terminal through inverters 56 and 56'. The internal switching signals 40 and 40' are inputted to OR logical circuits 54 and 54' respectively without flowing through the inverters 56 and 56'.

The SR flip-flops 55 and 55' using the negative logic, when they receive a Low level signal through its S terminal, hold the output of signals 36 and 36' in a High level state and when they receive a Low level signal through its R terminal, they hold the output of the signals 36 and 36' in the L level state.

The output signals 37 and 37' from first flip-flops 32 and 32' which operate in synchronization with frame pulses 26 and 26' are converted, by their passage through inverters 38 and 38', to switching request signals 39 and 39' respectively. Also, output signals 37 and 37' are inputted, together with input signals fed through R terminals of the SR flip-flops 55 and 55', to AND logical circuits 57 and 57'. Furthermore, internal switching signals 40 and 40' and switching request signals 39 and 39' to other system are inputted to AND logical circuits 58 and 58'. The outputs from both AND logical circuits 57 and 57' and from 58 and 58' are inputted to OR logical circuits 59 and 59' respectively.

Output signals 60 and 60' from these OR logical circuits are inputted to the second flip-flops 33 and 33' which operate in synchronization with switching timing pulses 35 and 35'.

Timing charts shown in FIG. 6 illustrate the state wherein the first information transmission system 1 is functioning as a standby system and the second information transmission system 1' as an active system and wherein the frame pulses from the active system lead those from the standby system.

The internal switching signal 40 corresponding to the information transmission system 1 functioning as a standby system is held at its L level in the initial state. This Low level signal which has been inputted to the AND logical circuit is outputted as a High level signal after the passage through the inverter 56 and then is inputted to the AND logical circuit 57. On the other hand, an H level signal has been inputted through the inverter 56 to the R terminal of the SR flip-flop 55. For this reason, the state of the input signal 60 to the second flip-flop 33 depends on a signal 36 to be inputted to the first flip-flop 32. As shown in FIG. 6 (c), because this signal 36 is held at the L level at the time before the control circuit 31 receives the switching instruction signal 22 and, as a result, the output signal 37 is also held at the L level causing the internal switching level 40 to be held at the L level, the first information transmission system 1 will not be switched to its active state.

If the switching instruction signal 22 is sent to the control section 31 in this state, an input signal to a S input terminal of the SR flip-flop is converted to an L level signal which then causes a signal 36 to be converted to an H level signal as shown in FIG. 6 (c). his signal 36 is outputted as an H level output signal 37 at the time when it receives a frame pulse (P2) from the first flip-flop 32 operating in synchronization with the frame pulse 26, i.e., at the time t2, from the first flip-flop 32.

The said output signal 37 fed from the first flip-flop is outputted as an H level output signal 60 through AND logical circuit 57 and OR logical circuit 59 to the second flip-flop 33.

The second flip-flop 33 which operates in synchronization with a switching timing pulse 35, when it receives a pulse P5 from a switching timing pulse generating section 34, sends out an H level internal switching signal 40 to the control circuit Ia. By this internal switching signal 40, the first information transmission system 1 is switched from its standby state to an active state, in the same manner as shown in FIG. 4, during the frame F2 following the frame F1 during which the control section 31 has received the switching instruction signal 22.

Also, the said output signal 37 fed from the first flip-flop 32 is converted, due to reversion of the polarity of the signal by the inverter 38, to a switching request signal 39. The switching request signal 39 is sent through AND logical circuit 58' and OR logical circuit 59' of the second information transmission system 1' functioning as an active system, as an H level output signal 60 to the second flip-flop 33'.

The second flip-flop 33 operating in synchronization with a switching timing pulse 35', when it receives a pulse (P 10) from a switching timing pulse generating section 34', sends out an L level internal switching signal 40 to the control circuit 1a as shown in FIGS. 6 (n) and (p). By this internal switching signal 40', the first information transmission system 1 is switched from its active state to a standby state during the frame F2' corresponding to the frame F2 following the frame F1 during which the control section 31 has received the switching instruction signal 22 in the same manner as shown in FIG. 4.

Accordingly, in the non-break change-over system 50 of the present invention, as in the non-break change-over system 30 described above, when the frame from the active system leads that from the standby system, the switching between the active and standby states occurs during the same frame corresponding to each other, thus allowing the switching between the two states without such lack of information being equivalent to one frame as seen in the conventional device.

In addition, according to the present invention, the non-break change-over device allows preferable switching even in the state where the frame from the active system leads that from the standby system.

That is, in the non-break change-over device shown in FIG. 2, the switching request signal 39 requesting for the switching from the active state to the standby state is returned back to the control section 31I' and, after its passage through this control section and the first flip-flop 32', the signal is inputted as an output signal 37' to the second flip-flop 33'. In the non-break change-over device shown in FIG. 5, however, the switching request signal 39 requesting for the switching from the active state to the standby state is inputted to the second flip-flop 33, without the passage through the control section 31' and the first flip-flop 32', i.e., without a delay in terms of time.

As described later, even in the state where the frame from the active system leads that from the standby system, avoidance of overlapping operations in switching as an active system in both information transmission systems 1 and 1' and preferable switching without such lack of information being equivalent to a frame as described above are made possible.

Referring to FIG. 7, the state is described wherein the control section 31 corresponding to the standby system receives the switching instruction signal 22 at the time when the frames F1, F2 and so on from the active system lead F1', F2' and so on from the standby systems, for example, during the frame F1 followed by the frame F2. In this state, the information transmission system functioning as the standby system 1 is switched to an active system, by an internal switching signal 40 based on the said synchronization actions of the first flip-flop 32 and the second flip-flop 33, during the frame F2 following the frame F1. Also, the information transmission system functioning as an active system 1 is switched to a standby system, by an internal switching signal 40' based on the said synchronization actions of the second flip-flop 33' during the frame F2' corresponding to the frame F2. Accordingly, the non-break change-over device 50 of the present invention allows more preferable switching operations regardless of the lead or lag in the frame from the active and standby systems.

The present invention is not limited to the specific embodiments described above. It will be understood by those skilled in the art that any circuit may be used if it so functions that, when the switching instruction is received from the monitoring section, the timing of outputting a switching request signal used to transfer the switching instruction to the other system can be delayed until a subsequent frame pulse is inputted. That is, it is possible to implement, with a variety of hardware including a shift register, counter, any circuit having the same functions as described above and the like. The circuit can be also composed of a microprocessor combined with software.

By the control of timing wherein an internal switching signal is outputted during a frame following the frame during which the switching instruction signal has been received and wherein the switching request signal is outputted to the other system at the time of beginning of a frame following the frame during which the switching instruction signal has been received, switching between an active system and a standby system can be achieved simultaneously during the subsequent frame as described above.

Effects of the Invention

Thus, by using a redundancy configuration and outputting a switching instruction signal fed from a monitoring section to an active system and by making the outputting of a switching request signal delayed in switching operations of both systems as described above, non-break switching during the same frame is made possible.

What is claimed is:

1. A non-break change-over device for complementarily switching first and second information transmission systems between an active state and a standby state and for constituting a redundancy system together with both of the information transmission systems having the same functions and handling information in units of frames defined by frame pulses corresponding to the information transmission systems, the frame pulses having the same period, the non-break change-over device comprising:

a monitoring section monitoring each of the information transmission systems and generating a switching instruction signal to switch one of the information transmission systems, functioning as a standby system, to an active system when a necessity occurs for switching the information transmission systems between the active state and standby state, first and second internal switching circuits respectively corresponding to the first and second information transmission systems, the first internal switching circuit being operable upon receiving the switching signal from the monitoring section when the first information transmission system is in the standby state, to generate an internal switching signal and output the internal switching signal in synchronization with timing pulses each having the same period as the frame pulse corresponding to the first information transmission system, but being out of phase with the frame pulse in order to cause the second information system to be switched to the active state, the second internal switching circuit being operable upon receiving the switching instruction signal from the monitoring section when the second information transmission system is in the standby state, to generate the internal switching signal and output the internal switching signal in synchronization with timing pulses each having the same period as the frame pulse corresponding to the second information transmission system, but being out of phase with the frame pulse in order to cause the first information transmission system to be switched to the active state, first and second external switching circuits, respectively corresponding to the first and second information transmission systems, the first external switching circuit being operable upon receiving the switching signal from the monitoring section when the first information transmission system is in the standby state to output a switching request signal to the second internal switching circuit in order to cause the second information transmission system to operate as the standby system, the second external switching circuit being operable upon receiving the switching signal from the monitoring section the second information transmission system is in the standby state to output a switching request signal to the first internal switching circuit in order to cause the first information transmission system to operate as the standby system, and first and second delay circuits respectively corresponding to the first and second information transmission systems, the first delay circuit providing a time-delay to the switching request signal to be fed from the first external switching circuit to the second internal switching circuit and the second delay circuit providing a time-delay to the switching request signal to be fed from the second external switching circuit to the first internal switching circuit, in order to perform switching operations between the standby state and active state in the first and second information transmission systems during the same frame of pulses corresponding to the first and second information transmission systems.

2. The non-break change-over device defined in claim 1, wherein each timing pulse for each of the first and second information transmission systems is out of phase with the frame pulse by about half the period for each of the corresponding first and second information transmission systems.

3. The non-break change-over device defined in claim 1, wherein when the first information transmission system is functioning as the standby system, the first internal switching circuit receives the switching instruction signal from the monitoring section through the second external switching circuit, the first internal switching circuit outputs the internal switching signal during a first frame subsequent to a frame during which the second external switching circuit receives the switching instruction signal, and at a time of a head of a frame following the first frame, the first external switching circuit outputs the switching request signal toward the second internal switching circuit; and when the second information transmission system is functioning as the standby system, the second internal switching circuit receives the switching instruction signal from the monitoring section through the first external switching circuit, the second internal switching circuit outputs the internal switching signal during a second frame subsequent to a frame during which the first external switching circuit receives the switching instruction signal, and at a time of a head of a frame following the second frame, the second external switching circuit outputs the switching request signal toward the first internal switching circuit.

4. The non-break change-over device defined in claim 1, wherein the first and second delay circuits operate in synchronization with the frame pulse for the first and second information transmission systems, respectively, wherein the first delay circuit comprises one first holding circuit to hold the switching request signal to be sent to the second information transmission system when the frame pulse is received, the first internal switching circuit operating in synchronization with the timing pulse for the first information transmission system, and one second holding circuit to hold the switching request signal fed by the first holding circuit when the timing pulse is received; and the first delay circuit comprising an other first holding circuit to hold the switching request signal to be sent to the first information transmission system when the frame pulse is received, the second internal switching circuit operating in synchronization with the timing pulse for the second information transmission system, and an other second holding circuit to hold the switching request signal fed by the other first holding circuit when the timing pulse is received.

5. The non-break change-over device defined in claim 4, wherein the first and second holding circuits comprise flip-flops.

6. The non-break change-over device defined in claim 5, wherein the flip-flops are D flip-flops.

7. A non-break change-over device for complementarily switching first and second information transmission systems between an active state and a standby state and for constituting a redundancy system together with both of the first and second information transmission systems each having the same functions, each of the first and second information transmission systems handling information in units of frames defined by frame pulses corresponding the first and second information transmission systems, the frame pulses having the same periods as each other, the non-break change-over device comprising:

a monitoring section monitoring the first and second information transmission systems and generating switching instruction signals to switch either of the first and second information transmission systems when functioning as a standby system to an active system when a necessity occurs for switching the first and second information transmission systems between the active state and the standby state, one first flip-flop corresponding to the first information transmission system, the one first flip-flop for use to output in synchronization with the frame pulse corresponding to the first information transmission system a switching request signal upon receiving the switching instruction signal from the monitoring section, thereby to cause the second information transmission system to function as a standby system or the first information transmission system to function as an active system, an other first flip-flop corresponding to the second information transmission system, the other first flip-flop for use to output in synchronization with the frame pulse corresponding to the second information transmission system a switching request signal upon receiving the switching instruction signal from the monitoring section, thereby to cause the second information system to function as a standby system, one second flip-flop corresponding to the first information transmission system, wherein the one second flip-flop, upon receiving the switching request signal fed by the one first flip-flop, is used to output, in synchronization with a timing pulse having the same period as the frame pulse for the one information transmission system for which the second flip-flop is provided and being out of phase with the frame pulse, an internal switching signal, to the first and second information transmission systems, wherein switching operations of the first information transmission system to the active state performed by the switching request signal from the one second flip-flop corresponding to the first information transmission system and of the second information transmission system to a standby state by the switching request signal from the other second flip-flop occur during the same frame corresponding to both of the first and second information transmission systems.

8. The non-break change-over device defined in claim 7 wherein, during a first frame following a second frame during which the one first flip-flop has received the signal corresponding to the switching instruction signal from the monitoring section, the one second flip-flop outputs the internal switching signal, and the one second flip-flop, at a time of a head of a frame following the second frame, outputs the switching request signal to the other first flip-flop.

9. The non-break change-over device defined in claim 8, further comprising a control section between the monitoring section and each of the one and other first flip-flops, wherein the control section is used to output the switching instruction signal or the signal corresponding to the switching request signal to the corresponding one or other first flip-flop respectively when the switching instruction signal is received from the monitoring section or the switching request signal is received from the one first flip-flop receiving the switching instruction signal.

10. The non-break change-over device defined in claim 9, wherein the control section provided corresponding to the first information transmission system, when it receives the switching instruction signal from the monitoring section, and even if it receives the switching request signal from the other first flip-flop, neither responds to this switching request signal nor outputs the signal to the one first flip-flop.

11. The non-break change-over device defined in claim 8, further comprising a respective control section between the monitoring section and each of the one and other first flip-flops, used to output the signal corresponding to the switching instruction signal to the corresponding first flip-flop when the control section receives the switching instruction signal from the monitoring section and the switching request signal fed by the first flip-flop provided corresponding to the first information transmission system is inputted to the other second flip-flop, and the second flip-flop, when it receives the switching request signal from the first flip-flop, outputs the internal switching signal in order to cause the second information transmission system to function as the standby system in synchronization with the timing pulse for the second information transmission system.

* * * * *